United States Patent
Schmidt et al.

(10) Patent No.: US 11,728,490 B2
(45) Date of Patent: Aug. 15, 2023

(54) CURRENT COLLECTORS HAVING SURFACE STRUCTURES FOR CONTROLLING FORMATION OF SOLID-ELECTROLYTE INTERFACE LAYERS

(71) Applicant: GM GLOBAL TECHNOLOGY OPERATIONS LLC, Detroit, MI (US)

(72) Inventors: Robert D. Schmidt, Howell, MI (US); Gayatri V. Dadheech, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 212 days.

(21) Appl. No.: 17/237,418

(22) Filed: Apr. 22, 2021

(65) Prior Publication Data

US 2022/0344669 A1 Oct. 27, 2022

(51) Int. Cl.
*H01M 4/66* (2006.01)
*H01M 10/0562* (2010.01)
*H01M 10/0525* (2010.01)

(52) U.S. Cl.
CPC ....... *H01M 4/667* (2013.01); *H01M 10/0525* (2013.01); *H01M 10/0562* (2013.01); *H01M 2220/20* (2013.01); *H01M 2300/008* (2013.01); *H01M 2300/0071* (2013.01)

(58) Field of Classification Search
CPC ............. H01M 4/667; H01M 10/0525; H01M 10/0562; H01M 2300/0071; H01M 2300/008

USPC ........................................................ 429/323
See application file for complete search history.

(56) References Cited

U.S. PATENT DOCUMENTS

| | | | |
|---|---|---|---|
| 8,974,946 B2 | 3/2015 | Cai et al. |
| 9,123,939 B2 | 9/2015 | Xiao et al. |
| 9,160,036 B2 | 10/2015 | Yang et al. |
| 9,252,411 B2 | 2/2016 | Abd Elhamid et al. |
| 9,302,914 B2 | 4/2016 | Liu et al. |

(Continued)

FOREIGN PATENT DOCUMENTS

| | | |
|---|---|---|
| CN | 115241456 A | 10/2022 |
| DE | 102022105212 A1 | 10/2022 |
| WO | 2017045573 A1 | 3/2017 |

*Primary Examiner* — James M Erwin
(74) *Attorney, Agent, or Firm* — Harness, Dickey & Pierce, P.L.C.

(57) ABSTRACT

The present disclosure provides an electrochemical cell that includes an electrically conductive material layer, a precursor material disposed on or adjacent to a first surface of the electrically conductive material layer, and an electroactive material layer disposed on or adjacent to the precursor material. In certain variations, the precursor material forms a continuous layer and a solid-electrolyte interface layer is disposed on or adjacent to an exposed surface of the electroactive material layer. In other variations, the precursor material forms a plurality of distinct precursor structures disposed on the first surface of the electrically conductive material layer in a predetermined pattern, such that at least a portion of each distinct precursor structure is unobstructed by the electroactive material layer. The distinct precursor structures are configured to form surface structures that chemically attach the solid-electrolyte interface layer and the electrically conductive material layer.

19 Claims, 6 Drawing Sheets

(56) References Cited

U.S. PATENT DOCUMENTS

| | | |
|---|---|---|
| 9,362,552 B2 | 6/2016 | Sohn et al. |
| 9,373,829 B2 | 6/2016 | Xiao et al. |
| 9,437,871 B2 | 9/2016 | Zhou et al. |
| 9,537,144 B2 | 1/2017 | Huang et al. |
| 9,647,254 B2 | 5/2017 | Dadheech et al. |
| 9,742,028 B2 | 8/2017 | Zhou et al. |
| 9,896,763 B2 | 2/2018 | Dadheech et al. |
| 9,905,847 B2 | 2/2018 | Dadheech et al. |
| 9,923,189 B2 | 3/2018 | Xiao |
| 9,929,435 B2 | 3/2018 | Cai et al. |
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,381,170 B2 | 8/2019 | Dai et al. |
| 10,396,360 B2 | 8/2019 | Xiao et al. |
| 10,573,879 B2 | 2/2020 | Yang et al. |
| 10,622,627 B2 | 4/2020 | Dadheech et al. |
| 10,629,941 B2 | 4/2020 | Dai et al. |
| 10,680,281 B2 | 6/2020 | Yersak et al. |
| 2013/0048924 A1* | 2/2013 | Amatucci ............ H01M 10/052 |
| | | 423/489 |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2015/0349307 A1 | 12/2015 | Dadheech et al. |
| 2016/0111721 A1 | 4/2016 | Xiao et al. |
| 2016/0172706 A1 | 6/2016 | Xiao et al. |
| 2016/0172710 A1 | 6/2016 | Liu et al. |
| 2017/0271678 A1 | 9/2017 | Yang et al. |
| 2018/0100245 A1 | 4/2018 | Liu et al. |
| 2018/0309165 A1 | 10/2018 | Yersak et al. |
| 2018/0309166 A1 | 10/2018 | Yersak et al. |
| 2018/0375148 A1 | 12/2018 | Yersak et al. |
| 2019/0190071 A1* | 6/2019 | Haruna ............ H01M 10/0568 |
| 2019/0233388 A1* | 8/2019 | Amine ................ H01M 10/052 |
| 2019/0341615 A1 | 11/2019 | Xiao et al. |
| 2019/0372155 A1 | 12/2019 | Yersak et al. |
| 2019/0393549 A1 | 12/2019 | Yersak et al. |
| 2019/0393564 A1* | 12/2019 | Miura .................... H01M 4/587 |
| 2020/0044231 A1* | 2/2020 | Han ...................... H01M 4/483 |
| 2020/0052338 A1 | 2/2020 | Liu et al. |
| 2020/0075996 A1* | 3/2020 | Han .................. H01M 10/0525 |
| 2020/0127282 A1 | 4/2020 | Yersak et al. |
| 2020/0168908 A1* | 5/2020 | Kim ...................... H01M 4/131 |

* cited by examiner

CURRENT COLLECTORS HAVING SURFACE STRUCTURES FOR CONTROLLING FORMATION OF SOLID-ELECTROLYTE INTERFACE LAYERS

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator and/or electrolyte may be disposed between the negative and positive electrodes. The electrolyte is suitable for conducting lithium ions (or sodium ions in the case of sodium-ion batteries, or potassium ions in the case of potassium-ion batteries, or magnesium ions in the case of magnesium-ion batteries, or the like) between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Conventional rechargeable lithium-ion batteries operate by reversibly passing lithium ions back and forth between the negative electrode and the positive electrode. For example, lithium ions may move from the positive electrode to the negative electrode during charging of the battery, and in the opposite direction when discharging the battery. Such lithium-ion batteries can reversibly supply power to an associated load device on demand. More specifically, electrical power can be supplied to a load device by the lithium-ion battery until the lithium content of the negative electrode is effectively depleted. The battery may then be recharged by passing a suitable direct electrical current in the opposite direction between the electrodes.

During discharge, the negative electrode may contain a comparatively high concentration of intercalated lithium or lithium metal, which is typically oxidized into lithium ions releasing electrons. Lithium ions may travel from the negative electrode to the positive electrode, for example, through the ionically conductive electrolyte solution contained within the pores of an interposed porous separator. Concurrently, electrons pass through an external circuit from the negative electrode to the positive electrode. Such lithium ions may be assimilated into the material of the positive electrode typically by an electrochemical reduction reaction. The battery may be recharged or regenerated after a partial or full discharge of its available capacity by an external power source, which reverses the electrochemical reactions that transpired during discharge.

In various instances, however, a portion of the lithium remains with the negative electrode following the first cycle due to, for example, conversion reactions and/or the formation of a solid electrolyte interphase (SEI) layer on the negative electrode during the first cycle, as well as ongoing lithium loss due to, for example, continuous solid electrolyte interphase breakage. Such permanent loss of lithium ions may result in a decreased specific energy and power in the battery resulting from, for example, added positive electrode mass that does not participate in the reversible operation of the battery. For example, the lithium-ion battery may experience an irreversible capacity loss of greater than or equal to about 5% to less than or equal to about 30% after the first cycle, and in the instance of silicon-containing negative electrodes, an irreversible capacity loss of greater than or equal to about 20% to less than or equal to about 40% after the first cycle. Accordingly, it would be desirable to develop improved electrodes and electroactive materials, and methods of making and using the same, that can address these challenges.

SUMMARY

This section provides a general summary of the disclosure, and is not a comprehensive disclosure of its full scope or all of its features.

The present disclosure relates to current collectors having surface structures that help to control the formation of solid-state electrolyte layers in electrochemical cells including the current collectors.

In various aspects, the present disclosure provides a current collector for an electrochemical cell. The current collector includes an electrically conductive material layer, and a precursor material disposed on or adjacent to a first surface of the electrically conductive material layer, where the precursor material has an ionic conductivity less than about $10^{-4}$ S/cm.

In one aspect, the precursor material may be disposed on or adjacent to the first surface of the electrically conductive material so as form a substantially continuous layer. The substantially continuous layer may have an average thickness greater than or equal to about 0.001 μm to less than or equal to about 20 μm.

In one aspect, the precursor material may be disposed on or adjacent to the first surface of the electrically conductive material so as form a plurality of distinct precursor structures on the first surface of the electrically conductive material layer. The distinct precursor structures may be disposed in a predetermined pattern on the first surface of the electrically conductive material layer.

In one aspect, the distinct precursor structures may cover greater than or equal to about 1% to less than or equal to about 50% of a total surface area of the first surface of the electrically conductive material layer.

In one aspect, the distinct precursor structures may have an average spacing greater than or equal to about 0.1 μm to less than or equal to about 50 μm.

In one aspect, the precursor material includes one or more materials selected from the group consisting of: polytetrafluoroethylene (PTFE), lithium fluoride (LiF), polyvinylidene difluoride (PVdF), perfluoro-organosiloxane, and combinations thereof.

In various aspects, the present disclosure provides an electrochemical cell. The electrochemical cell may include an electrically conductive material layer, a precursor material disposed on or adjacent to a first surface of the electrically conductive material layer, and an electroactive material layer disposed on or adjacent to the precursor material. The precursor material may have an ionic conductivity less than about $10^{-4}$ S/cm.

In one aspect, the precursor material may be disposed on or adjacent to the first surface of the electrically conductive material so as form a substantially continuous layer. The substantially continuous layer may have an average thickness greater than or equal to about 0.001 μm to less than or equal to about 20 μm.

In one aspect, the electrochemical cell may further include a solid-electrolyte interface layer disposed on or adjacent to an exposed surface of the electroactive material layer.

In one aspect, the solid-electrolyte interface layer may include one or more materials selected from the group consisting of: lithium carbonate ($Li_2CO_3$), lithium peroxide ($Li_2O_2$), lithium hydroxide (LiOH), lithium oxide ($Li_2O$), lithium fluoride (LiF), lithium nitride ($Li_3N$), polyolefins, semicarbonates, and combinations thereof.

In one aspect, the precursor material may be disposed on or adjacent to the first surface of the electrically conductive material layer so as form a plurality of distinct precursor structures disposed on the first surface of the electrically conductive material layer in a predetermined pattern.

In one aspect, at least a portion of each distinct precursor structure may be unobstructed by the electroactive material layer.

In one aspect, at least a portion of each distinct precursor structure may extend through the electroactive material layer.

In one aspect, the distinct precursor structures may cover greater than or equal to about 1% to less than or equal to about 50% of a total surface area of the first surface of the electrically conductive material layer.

In one aspect, the distinct precursor structures may have an average spacing greater than or equal to about 0.1 μm to less than or equal to about 50 μm.

In one aspect, an average height of each distinct precursor structure is greater than or equal to about 20% to less than or equal to about 400% greater than an average thickness of the electroactive material layer.

In one aspect, an average height of each distinct precursor structure may be greater than about 1 μm to less than or equal to about 500 μm, and the electroactive material layer may have an initial thickness greater than about 10 μm to less than or equal to about 200 μm.

In one aspect, the electrochemical cell may further include a solid-electrolyte interface layer disposed on or adjacent to an exposed surface of the electroactive material layer and contacting each of the distinct precursor structures. The distinct precursor structures may be configured to form surface structures that chemically attach the solid-electrolyte interface layer and the electrically conductive material layer.

In one aspect, the solid-electrolyte interface layer may include one or more materials selected from the group consisting of: lithium carbonate ($Li_2CO_3$), lithium peroxide ($Li_2O_2$), lithium hydroxide (LiOH), lithium oxide ($Li_2O$), lithium fluoride (LiF), lithium nitride ($Li_3N$), polyolefins, semicarbonates, and combinations thereof.

In one aspect, the precursor material may include one or more materials selected from the group consisting of: polytetrafluoroethylene (PTFE), lithium fluoride (LiF), polyvinylidene difluoride (PVdF), perfluoro-organosiloxane, and combinations thereof.

In various aspects, the present disclosure may provide an electrochemical cell. The electrochemical cell may include an electrically conductive material layer, a plurality of distinct precursor structures disposed on the first surface of the electrically conductive material layer in a predetermined pattern, and an electroactive material layer disposed on or adjacent to the precursor material such that at least a portion of each distinct precursor structure is unobstructed by the electroactive material layer. The distinct precursor structures may cover greater than or equal to about 1% to less than or equal to about 50% of a total surface area of the first surface of the electrically conductive material layer, and the distinct precursor structures may have an average spacing greater than or equal to about 0.1 μm to less than or equal to about 50 μm.

In one aspect, at least a portion of each distinct precursor structure may extend through the electroactive material layer.

In one aspect, the electrochemical cell may further include a solid-electrolyte interface layer disposed on or adjacent to an exposed surface of the electroactive material layer and contacting each of the distinct precursor structures. The distinct precursor structures may be configured to form surface structures that chemically attach the solid-electrolyte interface layer and the electrically conductive material layer.

In one aspect, the solid-electrolyte interface layer may include one or more materials selected from the group consisting of: lithium carbonate ($Li_2CO_3$), lithium peroxide ($Li_2O_2$), lithium hydroxide (LiOH), lithium oxide ($Li_2O$), lithium fluoride (LiF), lithium nitride ($Li_3N$), polyolefins, semicarbonates, and combinations thereof.

In one aspect, each of the distinct precursor structures may include one or more materials selected from the group consisting of: polytetrafluoroethylene (PTFE), lithium fluoride (LiF), polyvinylidene difluoride (PVdF), perfluoro-organosiloxane, and combinations thereof.

In various aspects, the present disclosure provides an electrochemical cell. The electrochemical cell may include an electrically conductive material layer, an electroactive material layer disposed on or adjacent to an exposed surface of the electrically conductive material layer, a solid-electrolyte interface layer disposed on or adjacent to an exposed surface of the electroactive material layer, and a plurality of distinct surface structures freely available through the electroactive material layer and chemically attaching a first surface of the electrically conductive material layer and the solid-electrolyte interface layer.

In one aspect, the plurality of surface structures may include lithium fluoride (LiF).

In one aspect, the solid-electrolyte interface layer may include one or more materials selected from the group consisting of: lithium carbonate ($Li_2CO_3$), lithium peroxide ($Li_2O_2$), lithium hydroxide (LiOH), lithium oxide ($Li_2O$), lithium fluoride (LiF), lithium nitride ($Li_3N$), polyolefins, semicarbonates, and combinations thereof.

In one aspect, the distinct surface structures may cover greater than or equal to about 1% to less than or equal to about 50% of a total surface area of the first surface of the electrically conductive material layer.

In one aspect, the distinct surface structures may have an average spacing greater than or equal to about 0.1 μm to less than or equal to about 50 μm.

In various aspects, the present disclosure provide a method for securing a solid-electrolyte interface layer. The method may include disposing a precursor material on or adjacent to an electrically conductive material layer. The precursor material may have an ionic conductivity less than about $10^{-4}$ S/cm. The method may further include disposing an electroactive material layer on or adjacent to the precursor material. The precursor material may be configured to form surface structures that chemically attach the electrically conductive material layer and a solid-electrolyte interface layer disposed or formed on an exposed surface of the electroactive material layer.

In one aspect, the precursor material may be disposed on or adjacent to the first surface of the electrically conductive material so as form a substantially continuous layer. The substantially continuous layer may have an average thickness greater than or equal to about 0.001 µm to less than or equal to about 20 µm.

In one aspect, the precursor material may be disposed on or adjacent to the first surface of the electrically conductive material layer so as form a plurality of distinct precursor structures disposed on the first surface of the electrically conductive material layer in a predetermined pattern.

In one aspect, at least a portion of each distinct precursor structure may be unobstructed by the electroactive material layer.

In one aspect, at least a portion of each distinct precursor structure may extend through the electroactive material layer.

In one aspect, the precursor material may include one or more materials selected from the group consisting of: polytetrafluoroethylene (PTFE), lithium fluoride (LiF), polyvinylidene difluoride (PVdF), perfluoro-organosiloxane, and combinations thereof.

In one aspect, the solid-electrolyte interface layer may include one or more materials selected from the group consisting of: lithium carbonate ($Li_2CO_3$), lithium peroxide ($Li_2O_2$), lithium hydroxide (LiOH), lithium oxide ($Li_2O$), lithium fluoride (LiF), lithium nitride ($Li_3N$), polyolefins, semicarbonates, and combinations thereof.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Figure 1:
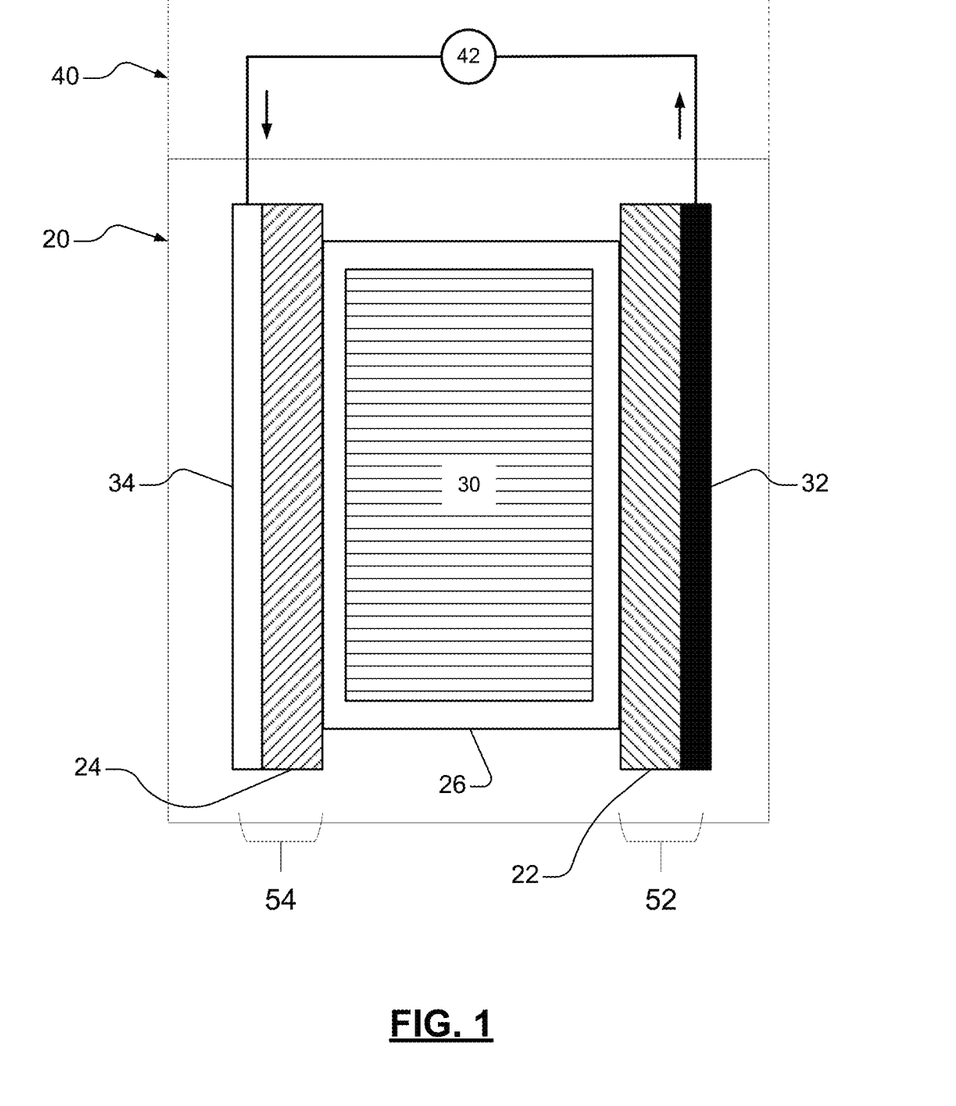
FIG. 1 is a schematic of an example electrochemical battery cell.

A typical lithium-ion battery (e.g., electrochemical cell that cycles lithium ions) includes a first electrode (such as, a positive electrode or cathode) opposing a second electrode (such as, a negative electrode or anode) and a separator and/or electrolyte disposed therebetween. Often, in a lithium-ion battery pack, batteries or cells may be electrically connected in a stack or winding configuration to increase overall output. Lithium-ion batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions (or sodium ions in the case of sodium-ion batteries, and the like) and may be in liquid, gel, or solid form. For example, exemplary and schematic illustration of an electrochemical cell (also referred to as a battery) 20 is shown in FIG. 1.

Such cells are used in vehicle or automotive transportation applications (e.g., motorcycles, boats, tractors, buses, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples include a single cathode and a single anode, the skilled artisan will recognize that the present teachings extend to various other configurations, including those having one or more cathodes and one or more anodes, as well as various current collectors with electroactive layers disposed on or adjacent to one or more surfaces thereof.

The battery 20 includes a negative electrode assembly 52 (e.g., anode), a positive electrode assembly 54 (e.g., cathode), and a separator 26 disposed between the negative electrode assembly 52 and the positive electrode assembly 52. The negative electrode assembly 52 may include a current collector 52 and a negative electroactive material layer 22. The positive electrode assembly 54 may include a current collector 34 and a positive electroactive material layer 24. The separator 26 provides electrical separation—prevents physical contact—between the negative electroactive material layer 22 and the positive electroactive material layer 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electroactive material layer 22 and positive electroactive material layer 24. In certain variations, the separator 26 may be a solid-state electrolyte. For example, the separator 26 may be defined by a plurality of solid-state electrolyte particles (not shown).

A negative electrode current collector 32 may be positioned at or near the negative electroactive material layer 22. The negative electrode current collector 32 may be a metal foil, metal grid or screen, or expanded metal comprising copper or any other appropriate electrically conductive material known to those of skill in the art. A positive electrode current collector 34 may be positioned at or near the positive electroactive material layer 24. The positive electrode current collector 34 may be a metal foil, metal grid or screen, or expanded metal comprising aluminum or any other appropriate electrically conductive material known to those of skill in the art. The negative electrode current collector 32 and the positive electrode current collector 34 respectively collect and move free electrons to and from an external circuit 40. For example, an interruptible external circuit 40 and a load device 42 may connect the negative electrode assembly 52 (through the negative electrode current collector 32) and the positive electrode assembly 54 (through the positive electrode current collector 34).

The battery 20 can generate an electric current during discharge by way of reversible electrochemical reactions that occur when the external circuit 40 is closed (to connect the negative electrode assembly 52 and the positive electrode assembly 54) and the negative electroactive material layer 22 has a lower potential than the positive electroactive material layer 24. The chemical potential difference between the positive electroactive material layer 24 and the negative electroactive material layer 22 drives electrons produced by a reaction, for example, the oxidation of intercalated lithium, at the negative electrode assembly 52 through the external circuit 40 toward the positive electrode assembly 54. Lithium ions that are also produced at the negative electrode assembly 52 are concurrently transferred through the electrolyte 30 contained in the separator 26 toward the positive electrode assembly 54. The electrons flow through the external circuit 40 and the lithium ions migrate across the separator 26 containing the electrolyte 30 to form intercalated lithium at the positive electrode assembly 54. As noted above, electrolyte 30 is typically also present in the negative electrode assembly 52 and positive electrode assembly 54. The electric current passing through the external circuit 40 can be harnessed and directed through the load device 42 until the lithium in the negative electrode assembly 52 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode assembly 52 through the electrolyte 30 across the separator 26 to replenish the negative electrode assembly 52 with lithium (e.g., intercalated lithium or lithium metal or lithium metal alloy) for use during the next battery discharge event. As such, a complete discharging event followed by a complete charging event is considered to be a cycle, where lithium ions are cycled between the positive electrode assembly 54 and the negative electrode assembly 52. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electroactive material layer 22, separator 26, positive electroactive material layer 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode assembly 52, the positive electrode assembly 54, and/or the separator 26. The battery 20 shown in FIG. 1 includes a liquid electrolyte 30 and shows representative concepts of battery operation. However, the present technology also applies to solid-state batteries that include solid-state electrolytes and/or solid-state electroactive particles that may have different designs as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode assembly 54, the negative electrode assembly 52, and the separator 26 may each include an electrolyte solution or system 30 inside their pores, capable of conducting lithium ions (or sodium ions or potassium ions or magnesium ions, or the like) between the negative electrode assembly 52 and the positive electrode assembly 54. Any appropriate electrolyte 30, whether in solid, liquid, or gel form, capable of conducting lithium ions between the negative electrode assembly 52 and the positive electrode assembly 54 may be used in the lithium-ion battery 20. In certain aspects, the electrolyte 30 may be a non-aqueous liquid electrolyte solution (e.g., >1M) that includes a lithium salt dissolved in an organic solvent or a mixture of organic solvents. In certain instances, the electrolyte 30 may also include one or more additives, such as vinylene carbonate (VC), butylene carbonate (BC), fluoroethylene carbonate (FEC), and the like. Numerous conventional non-aqueous liquid electrolyte 30 solutions may be employed in the lithium-ion battery 20.

In certain aspects, the electrolyte 30 may be a non-aqueous liquid electrolyte solution that includes one or more lithium salts dissolved in an organic solvent or a mixture of organic solvents. The lithium salts may include one or more cations coupled with one or more anions. The cations may be selected from $Li^+$, $Na^+$, $K^+$, $Al^{3+}$, $Mg^{2+}$, and the like. The anions may be selected from $PF_6^-$, $BF_4^-$, $TFSI^-$, $FSI^-$, $CF_3SO_3^-$, $(C_2F_5S_2O_2)N^-$, and the like. For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof.

These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), and combinations thereof. The heat-resistant material may be selected from the group consisting of: Nomex, Aramid, and combinations thereof.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics. In certain aspects, the separator 26 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 26 are contemplated, as well as the many manufacturing methods that may be employed to produce such a microporous polymer separator 26. The separator 26 may have a thickness greater than or equal to about 1 μm to less than or equal to about 50 μm, and in certain instances, optionally greater than or equal to about 1 μm to less than or equal to about 20 μm.

In various aspects, the porous separator 26 and the electrolyte 30 disposed in the porous separator 26 in FIG. 1 may be replaced with a solid-state electrolyte ("SSE") (not shown) that functions as both an electrolyte and a separator. The solid-state electrolyte may be disposed between the positive electrode assembly 54 and negative electrode assembly 52. For example, between the positive electroactive material layer 24 and the negative electroactive material layer 22. The solid-state electrolyte facilitates transfer of lithium ions, while mechanically separating and providing electrical insulation between the negative electrode assembly 52 and the positive electrode assembly 24. By way of non-limiting example, solid-state electrolytes may include a plurality of solid-state electrolyte particles such as $LiTi_2(PO_4)_3$, $LiGe_2(PO_4)_3$, $Li_7La_3Zr_2O_{12}$, $Li_3xLa_{2/3}-xTiO_3$, $Li_3PO_4$, $Li_3N$, $Li_4GeS_4$, $Li_{10}GeP_2S_{12}$, $Li_2S—P_2S_5$, $Li_6PS_5Cl$, $Li_6PS_5Br$, $Li_6PS_5I$, $Li_3OCl$, $Li_{2.99}Ba_{0.005}ClO$, or combinations thereof. The solid-state electrolyte particles may be nanometer sized oxide-based solid-state electrolyte particles. In still other variations, the porous separator 26 and the electrolyte 30 in FIG. 1 may be replaced with a gel electrolyte.

The positive electrode assembly 54 may include a current collector 34 and a positive electroactive material layer 24. The positive electroactive material layer 24 may be formed from a lithium-based active material (or a sodium-based active material in the instance of sodium-ion batteries, or potassium-based active material in the instance of potassium-ion batteries, or magnesium-based active material in the instance of magnesium-ion batteries, or the like) that is capable of undergoing lithium intercalation and deintercalation, alloying and dealloying, conversion reaction, or plating and stripping, while functioning as the positive terminal of the battery 20. For example, the positive electroactive material layer 24 can be defined by a plurality of electroactive material particles (not shown) disposed in one or more layers so as to define the three-dimensional structure of the positive electroactive material layer 24. The electrolyte 30 may be introduced, for example after cell assembly, and contained within pores (not shown) of the positive electroactive material layer 24. In certain variations, the positive electroactive material layer 24 may include a plurality of electrolyte particles (not shown). In each instance, the positive electroactive material layer 24 (including the one or more layers) may have a thickness greater than or equal to about 1 μm to less than or equal to about 1,000 μm.

One exemplary common class of known electroactive materials that can be used to form the positive electroactive material layer 24 is layered lithium transitional metal oxides. For example, in certain aspects, the positive electroactive material layer 24 may comprise one or more materials having a spinel structure, such as lithium manganese oxide ($Li_{(1+x)}Mn_2O_4$, where $0.1 \leq x \leq 1$), lithium manganese nickel oxide ($LiMn_{(2-x)}Ni_xO_4$, where $0 \leq x \leq 0.5$) (e.g., $LiMn_{1.5}Ni_{0.5}O_4$); one or more materials with a layered structure, such as lithium cobalt oxide ($LiCoO_2$), lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$) (e.g., LiMn$_{0.33}$Ni$_{0.33}$Co$_{0.33}$O$_2$), or a lithium nickel cobalt metal oxide (LiNi$_{(1-x^*y)}$Co$_x$M$_y$O$_2$, where 0<x<0.2, y<0.2, and M may be Al, Mg, Ti, or the like); or a lithium iron polyanion oxide with olivine structure, such as lithium iron phosphate (LiFePO$_4$), lithium manganese-iron phosphate (LiMn$_{2-x}$Fe$_x$PO$_4$, where 0<x<0.5), or lithium iron fluorophosphate (Li$_2$FePO$_4$F).

In certain other aspects, the positive electroactive material layer 24 may include one or more high-voltage oxides (such as, LiNi$_{0.5}$Mn$_{1.5}$O$_4$, LiCoPO$_4$), one or more rock salt layered oxides (such as, LiCoO$_2$, LiNi$_x$Mn$_y$Co$_{1-x-y}$O$_2$ (where 0≤x≤1, 0≤y≤1), LiNi$_x$CO$_y$Al$_{1-x-y}$O$_2$ (where 0≤x≤1, 0≤y≤1), LiNi$_x$Mn$_{1-x}$O$_2$ (where 0≤x≤1), Li$_{1+x}$MO$_2$ (where 0≤x≤2 and where M refers to metal elements selected from Mn, Ni, Co, and the like), one or more polyanions (such as, LiV$_2$(PO$_4$)$_3$), and other like lithium transition metal oxides. The positive electroactive material may also be surface coated and/or doped. For example, the positive electroactive material may include LiNbO$_3$-coated LiNi$_{0.5}$Mn$_{1.5}$O$_4$.

In each instance, the positive electroactive materials may be optionally intermingled with an electronically conducting material that provides an electron conduction path and/or at least one polymeric binder material that improves the structural integrity of the electrode. For example, the positive electroactive materials and electronically or electrically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETCHEN™ black or DENKA' black or SuperP™), carbon fibers and nanotubes, graphene, graphene oxide, and the like. Examples of a conductive polymer include polyaniline, polythiophene, polyacetylene, polypyrrole, and the like. In certain aspects, mixtures of the conductive materials may be used.

For example, the positive electroactive material layer 24 may include greater than or equal to about 30 wt. % to less than or equal to about 98 wt. %, and in certain aspects, optionally greater than or equal to about 50 wt. % to less than or equal to about 95 wt. %, of the positive electroactive material; greater than or equal to about 0 wt. % to less than or equal to about 30 wt. %, and in certain aspects, optionally greater than or equal to about 5 wt. % to less than or equal to about 20 wt. %, of one or more electrically conductive materials; and greater than or equal to about 0 wt. % to less than or equal to about 20 wt. %, and in certain aspects, optionally greater than or equal to about 5 wt. % to less than or equal to about 15 wt. %, of one or more binders.

The negative electrode assembly 54 may include a current collector 32 and a negative electroactive material layer 22. The negative electroactive material layer 22 may be form from a lithium host material that is capable of functioning as a negative terminal of a lithium-ion battery (or a sodium host material in the instance of sodium-ion batteries, or potassium host material in the instance of potassium-ion batteries, or magnesium host material in the instance of magnesium-ion batteries, or the like). For example, the negative electroactive material layer 22 may comprise a lithium host material (e.g., negative electroactive material) that is capable of functioning as a negative terminal of the battery 20. In various aspects, the negative electroactive material layer 22 may be defined by a plurality of negative electroactive material particles (not shown). Such negative electroactive material particles may be disposed in one or more layers so as to define the three-dimensional structure of the negative electroactive material layer 22. The electrolyte 30 may be introduced, for example after cell assembly, and contained within pores (not shown) of the negative electroactive material layer 22. In certain variations, the negative electroactive material layer 22 may include a plurality of electrolyte particles (not shown). The negative electroactive material layer 22 (including the one or more layers) may have a thickness greater than or equal to about 1 μm to less than or equal to about 2,000 μm, and in certain aspects, optionally greater than or equal to about 10 μm to less than or equal to about 1,000 μm.

The negative electroactive material layer 22 may include a negative electroactive material that comprises lithium, such as, for example, lithium metal. In certain variations, the negative electroactive material layer 22 may be a film or layer formed of lithium metal or lithium metal alloy. Other materials can also be used, for example in certain variations combined with the lithium metal and/or lithium metal alloys, to form the negative electrode, including, for example, other metallic materials, like magnesium (Mg), sodium (Na), potassium (K), calcium (Ca), and the like. In certain variations, still other materials can also be used, for example in certain variations combined with the lithium metal and/or lithium metal alloys, to form the negative electroactive material layer 22, including, for example, carbonaceous materials (such as, graphite, hard carbon, soft carbon) and/or lithium-silicon, silicon containing binary and ternary alloys, and/or tin-containing alloys (such as, Si, Li—Si, SiO$_x$ (where 0≤x≤2), Si—Sn, SiSnFe, SiSnAl, SiFeCo, SnO$_2$, and the like). For example, in certain variations, the negative electroactive material layer 22 may be a silicon-based anode. Such silicon-based anodes may have a thickness less than or equal to about 10 μm.

In each instance, the negative electroactive material in the negative electroactive material layer 22 may be optionally intermingled with one or more electrically conductive materials that provide an electron conductive path and/or at least one polymeric binder material that improves the structural integrity of the negative electrode 22. For example, the negative electroactive material in the negative electrode 22 may be optionally intermingled with binders like polyimide, polyamic acid, polyamide, polysulfone, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

The negative electroactive material layer 22 may include greater than or equal to about 10 wt. % to less than or equal to about 99 wt. % of the electroactive materials, greater than or equal to about 0 wt. % to less than or equal to about 20 wt. % of the electronically conducting material, and greater than or equal to about 0 wt. % to less than or equal to about 20 wt. %, and in certain aspects, optionally greater than or equal to about 1 wt. % to less than or equal to about 20 wt. %, of the at least one polymeric binder. In certain variations, the negative electrode 22 may also include greater than or equal to about 0 wt. % to less than or equal to about 89 wt. % of a graphite active material.

In various aspects, a solid electrolyte interface (SEI) layer can form on or between a negative electroactive material layer (e.g., like the negative electroactive material layer 22 illustrated in FIG. 1), or a positive electroactive material layer (e.g., like the positive electroactive material layer 24 illustrated in FIG. 1), and a separator and/or electrolyte (e.g., like the separator 20 and/or electrolyte 30 illustrated in FIG. 1). In each instance, the solid electrolyte interface layer can provide protection for the negative electroactive material layer and/or the positive electroactive material layer. However, the solid electrolyte interface layer may become harmful to cell performance when it becomes too thick or physically degrades. The solid electrolyte interface layer often causes continuous electrolyte consumption and lithium ion loss, which can cause irreversible capacity fading in a lithium-ion battery. For example, the occurrence of any cracks or bends in the solid electrolyte interface layer during cycling causes the solid electrolyte interface layer to reform, for example at the new interfaces, which causes the consumption of additional electrolyte and lithium.

Figure 2A:
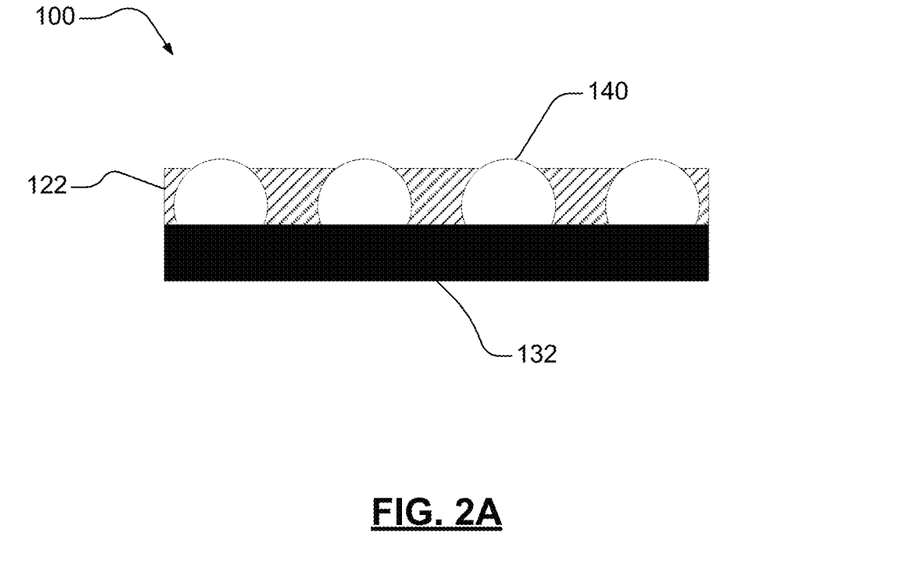
FIG. 2A is a cross-sectional view of an example electrode assembly (for use in a battery cell such as illustrated in FIG. 1) including a current collector and a plurality of precursor structures disposed on a surface of the current collector, where the precursor structures extend through an electroactive material layer so to form attachment points for a solid-electrolyte interface layer, in accordance with various aspects of the present disclosure.

In accordance with various aspects, the present disclosure provides a means for advantageously controlling the formation of a solid electrolyte interface layer between a negative electroactive material layer (e.g., like the negative electroactive material layer 22 illustrated in FIG. 1), or a positive electroactive material layer (e.g., like the positive electroactive material layer 24 illustrated in FIG. 1), and a separator and/or electrolyte (e.g., like the separator 20 and/or electrolyte 30 illustrated in FIG. 1). For example, FIG. 2A illustrates an example negative electrode assembly 100 having a negative electrode current collector 132 (e.g., like the negative current collector 32 illustrated in FIG. 1) that includes a plurality of distinct precursor structures 140 that are configured to form points of attachments (e.g., fixed points) for a solid-electrolyte interface layer 150, whether the solid-electrolyte interface layer 150 is formed in situ or as an artificial protective layer.

As illustrated, each of the distinct precursor structures 140 may at least partially extend through at least a portion of the electroactive material layer 122. The precursor structures 140 may have an average height or thickness that is greater than or equal to about 20% to less than or equal to about 400% greater than an average charged height or thickness of the electroactive material layer 122. For example, the electroactive material layer 122 may have an initial height or thickness greater than or equal to about 10 µm to less than or equal to about 200 µm, and the precursor structures 140 may have an average height or thickness greater than or equal to about 1 µm to less than or equal to about 500 µm, and in certain aspects, optionally greater than or equal to about 5 µm to less than or equal to about 500 µm. In each instance, at least a portion of each of the precursor structures 140 is freely available to form attachments with the solid-electrolyte interface layer 150. In certain variations, as illustrated, a portion of the precursor structures 140 may extend partially beyond an exposed surface of the electroactive material layer 122.

The precursor structures 140 may be formed using a material that has little or no conductivity with the current collector 132. For example, the material forming the precursor structures 140 may have an ionic conductivity that is less than the ionic conductivity of the electrolyte. The precursor material may have an ionic conductivity less than about $10^{-4}$ S/cm, and in certain aspects, optionally less than about $10^{-5}$ S/cm, at typical battery operating temperatures. Limiting the conductivity of the precursor structures 140 may help to prevent the precursor structure 140 from detaching from the current collector 132, while providing a strong attachment with the solid-electrolyte interface layer 150 so to prevent mechanical liftoff during cycling. In various aspects, the precursor structures 140 may include fluoride-containing materials that are able to produce lithium fluoride (LiF) as a decomposition product upon reaction with lithium metal. For example, the surface structures 140 may include polytetrafluoroethylene (PTFE), lithium fluoride (LiF), polyvinylidene difluoride (PVdF), perfluoro-organosiloxane, or the like.

Figure 2B:
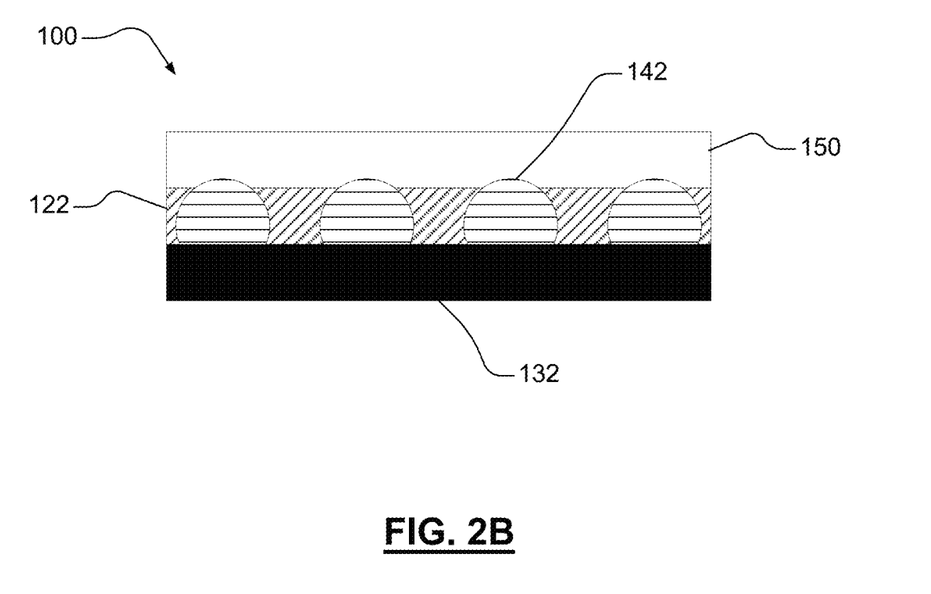
FIG. 2B is a cross-sectional view of an example electrode including a current collector, a plurality of surface structures disposed on a surface of the current collector, and a solid-state electrolyte interface layer attached to the current collector by the plurality of surface structures, where the surface structures are formed by a reaction of the precursor structures (as illustrated in FIG. 2A) with lithium, in accordance with various aspects of the present disclosure.

In each instance, as illustrated in FIG. 2B, the precursor structures 140 may form chemical attachments with the solid-electrolyte interface layer 150. For example, a reaction may occur between the negative electrode material (e.g., lithium material) forming the electroactive material layer 122 and the precursor structure 140 (e.g., polyvinylidene difluoride (PVdF)), to form lithium fluoride and other decomposition products (i.e., reaction by-products) that form surface structures 142 that attach the current collector 132 and the solid-electrolyte interface layer 150.

The chemical attachments (i.e., surface structures 142) may limit the free movement (e.g., flexing) of the solid-electrolyte interface layer 150. By limiting the movement of the solid-electrolyte interface layer 150, the surface structures 142 provide a mechanical means to control the growth and microstructure of the solid-electrolyte interface layer 150 on the electroactive material layer 122 (e.g., lithium metal), or at an interface between the electroactive material layer 122 and the separator and/or electrolyte (not shown), without the use of additives and variations in cycle rate. For example, the surface structures 142 may help to reduce or prevent premature cracking or degradation of the solid-electrolyte interface layer 150. More specifically, the location of the precursor structures 140, and therefore, the formed surface structures 142, may be chosen to selectively create regions of lithium plating or stripping and/or controlling other thermal and mechanical properties during cycling by the creation of structures (such as, lithium channels, rings, circles, or other shapes) with thermal conductivity and mechanical stiffness that differs from the surface structures 142.

The solid-electrolyte interface layer 150 may be a substantially continuous coating or layer. For example, the solid-electrolyte interface layer 150 may cover greater than or equal to about 90%, optionally greater than or equal to about 92%, optionally greater than or equal to about 95%, optionally greater than or equal to about 97%, optionally greater than or equal to about 98%, optionally greater than or equal to about 99%, or in certain aspects, optionally greater than or equal to about 99.5%, of the exposed surfaces of the surface structures 142 and the exposed surfaces of the electroactive material layer 122. The solid-electrolyte interface layer 150 may have an average height or thickness greater than or equal to about 0.1 µm to less than or equal to about 400 µm.

The solid-electrolyte interface layer 150 may include, for example, lithium carbonate ($Li_2CO_3$), lithium peroxide ($Li_2O_2$), lithium hydroxide (LiOH), lithium oxide ($Li_2O$), lithium fluoride (LiF), lithium nitride ($Li_3N$), polyolefins, semicarbonates, and other like inorganic or organic compounds. In certain variations, the solid-electrolyte interface layer 150 is formed in situ and its composition will depend on the selected battery materials, including, for example, the electrolyte and additives, and cycling and thermal history. In other variations, the solid-electrolyte interface layer 150 may be an artificial protective layer that is applied on or adjacent to the exposed surfaces of the surface structures 140 and the exposed surfaces of the electroactive material layer 122 prior to cell assembly.

Figure 2C:
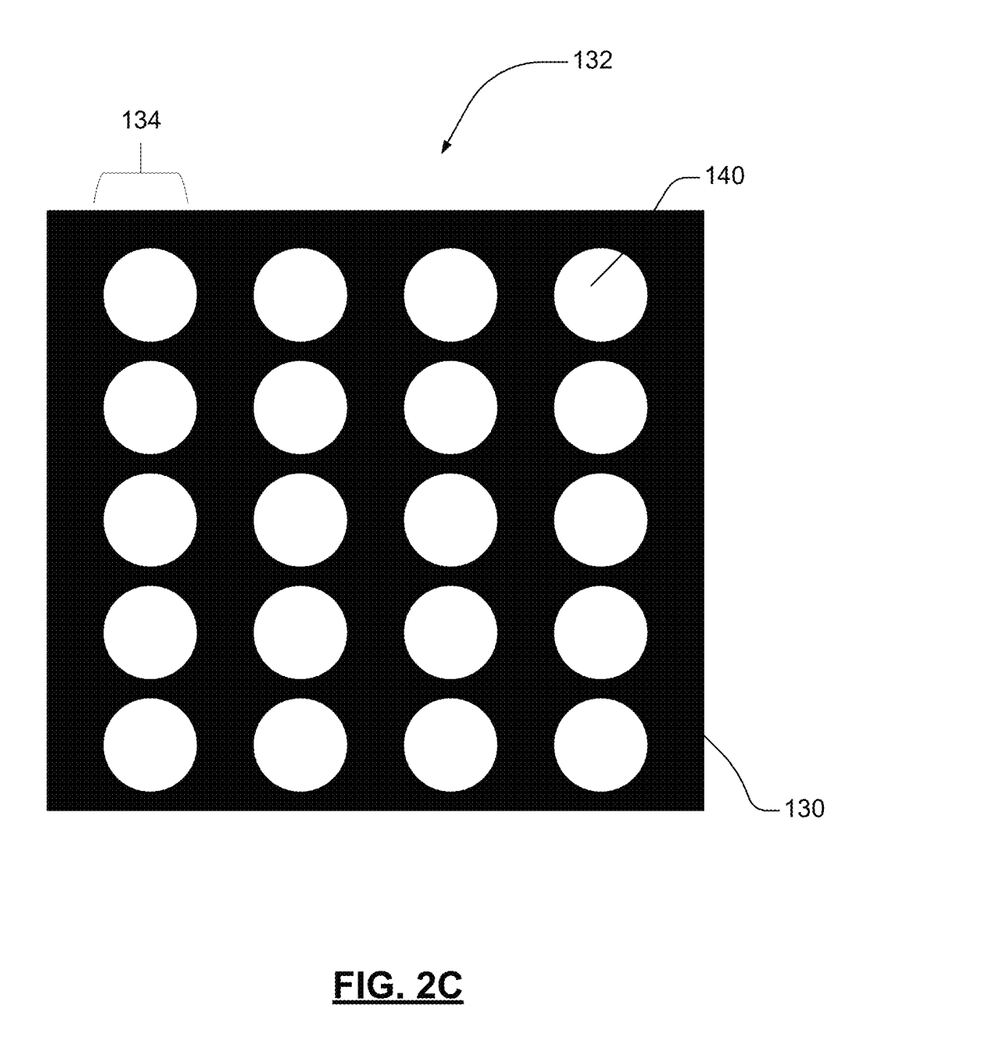
FIG. 2C is a plan view of an example current collector including a plurality of surface structures in accordance with various aspects of the present disclosure.
Figure 2D:
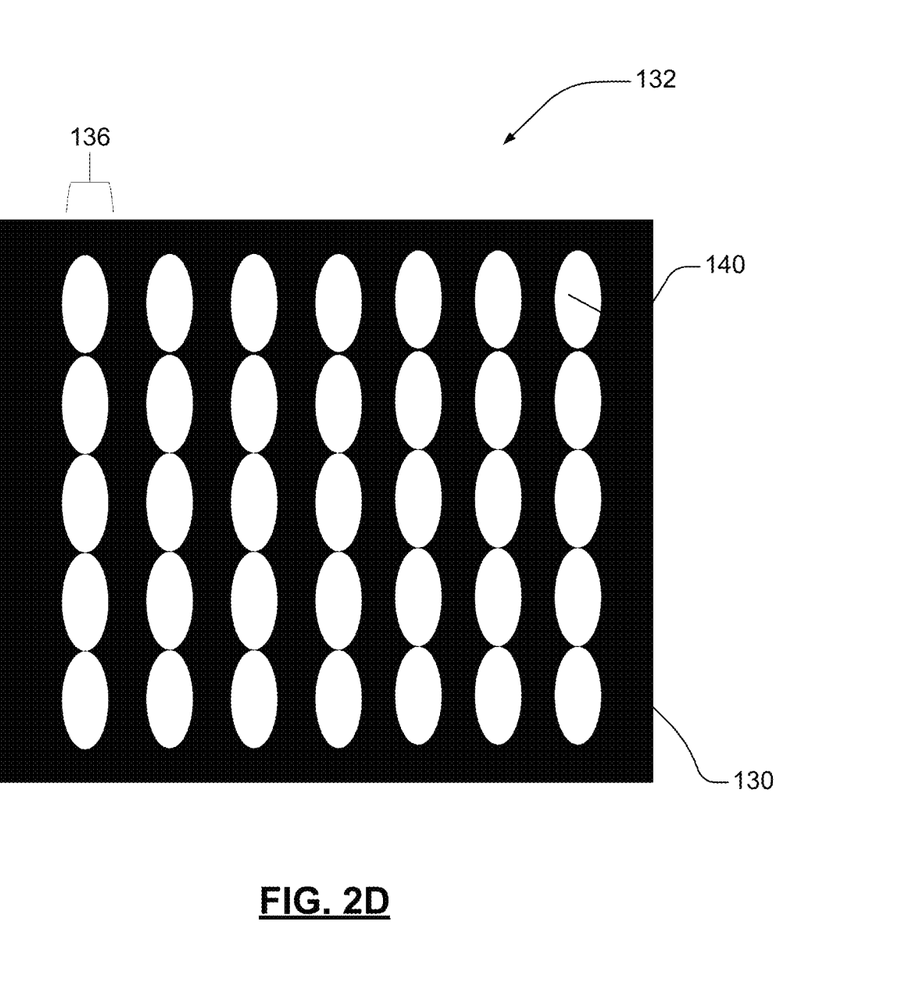
FIG. 2D is a plan view of another example current collector including a plurality of surface structures in accordance with various aspects of the present disclosure.
Figure 2E:
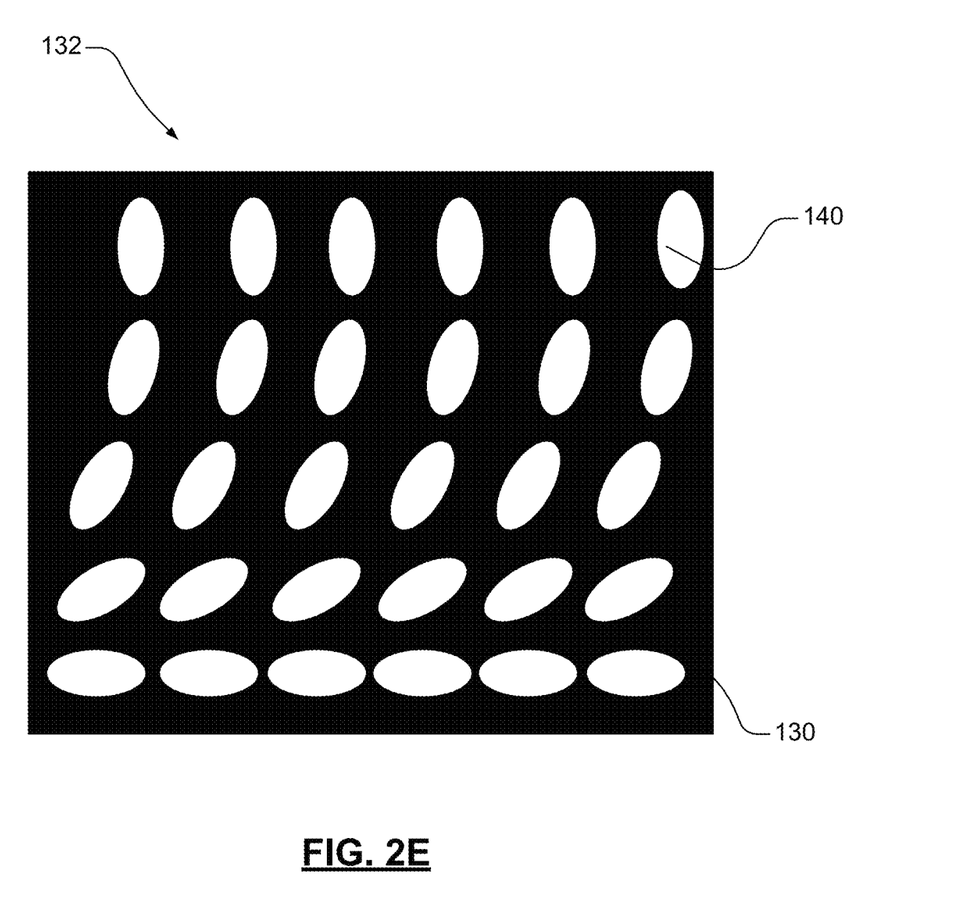
FIG. 2E is a plan view of yet another example current collector including a plurality of surface structures in accordance with various aspects of the present disclosure.

As illustrated in FIGS. 2C-2E, in various aspects, the precursor structures 140, and therefore, the surface structures 142, may a generally circular cross-sectional shape. The precursor structures 140 may have a three-dimensional structure, for example, that is substantially cylindrical or, in certain variations, fibrous. However, the skilled artisan will appreciate that, in various aspects, the precursor structures 140 may take other forms. For example only, in certain variations, the precursor structures 140 may have other cross-sectional shapes, such as a general oval shape, a general triangular shape, a general trapezoidal shape, a general line shape, a general flap shape, and the like.

The precursor structures 140, and therefore, the surface structures 142, may form a variety of patterns on the surface of the current collector 132. For example, as illustrated in FIG. 2C, in certain variations, the precursor structures 140 may be disposed so to form a plurality of linear rows 134 on the surface 130 of the current collector 132. In other variations, as illustrated in FIG. 2C, the precursor structures 140 may be disposed so to form a plurality of narrow channels 136 on the surface 130 of the current collector 132. In still other variations, as illustrated in FIG. 2E, the precursor structures 140 may be disposed in a spiral pattern on the surface 130 of the current collector 132. The skilled artisan will appreciate that although not specifically illustrated the precursor structures 140 may be disposed on the surface 130 of the current collector 132 so to form a variety of other patterns. For example, in various aspects, the precursor structures 140 may form grids, sets of channels, rings, or other mesoscale structures.

The patterns may be selected based on desired stripping or plating current densities, stress or strain optimization, thermal or electrical conductivity control, and the like. Creating different patterns can reduce the available area or volume, allowing an engineered approach for directing ionic current flow within the cell. For example, greater areal or volumetric densities can be formed in predetermined regions in a cell, for example, such as where the precursor structures 140 are disposed to form a plurality of narrow channels 136 as illustrated in FIG. 2D. The different patterns also allow for control over bending and/or heat flow during cycling by, for example, creating a set of fold lines where the battery may flex during operation, or a metallic channel to direct heat flow efficiently in one direction. Further still, the different patterns may allow for the creation of different regions suited for different operating conditions, including, for example, regions having improved robustness for fast charging. During fast charging, the kinetic limits of the electrolyte, or other components, may dictate how plating or stripping behavior is driven within the cell, and the pattern design may be selected so as to create partially, physically separated regions that may be used to direct current flow to desired regions within the cell. Those regions may have additional supports for the solid-electrolyte interface layer 150 so as to prevent degradation, thermal channels to control heat, or area and volume adjustments to accommodate the kinetics of plating lithium in a desired configuration.

In each instance, the precursor structures 140 may have an average spacing greater than or equal to about 0.1 µm to less than or equal to about 50 µm. The precursor structures 140 may cover greater than or equal to about 1% to less than or equal to about 50% of a total surface area of the surface 130 of the current collector 132.

Figure 3:
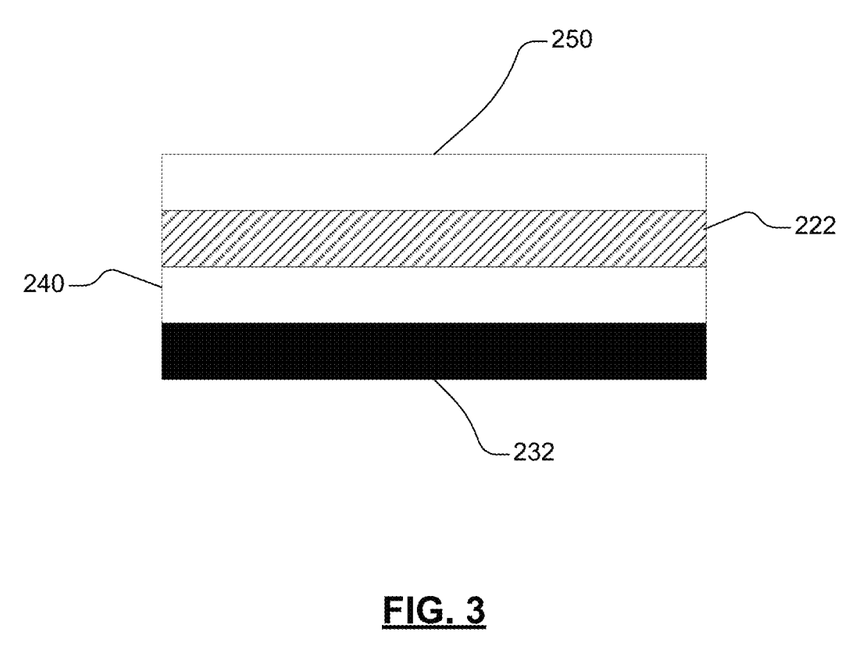
FIG. 3 is a cross-sectional view of an example electrode including an attachment interlayer between parallel surfaces of a current collector and an electroactive material layer, where the attachment interlayer facilitates bonding with a solid-electrolyte interface layer disposed on or at an exposed surface of the electroactive material layer, in accordance with various aspects of the present disclosure.

In still other variations, as illustrated in FIG. 3, an interlayer 240 may be disposed between a current collector 232 and an electroactive material layer 222. The interlayer 240 may be a substantially continuous layer or coating having a thickness greater than or equal to about 0.001 µm to less than or equal to about 20 µm, and covering greater than or equal to about 90%, optionally greater than or equal to about 92%, optionally greater than or equal to about 95%, optionally greater than or equal to about 97%, optionally greater than or equal to about 98%, optionally greater than or equal to about 99%, or in certain aspects, optionally greater than or equal to about 99.5%, of the first surface of the current collector 232.

The interlayer 240 may be an attachment layer for a solid-electrolyte interface layer 250 facilitated by the formation of lithium nucleation under the solid-electrolyte interface layer 250. In certain variations, the interlayer 240 may be a carbon coating. In other variations, the interlayer 240 may be a physical nucleation site of sufficiently inert material relative to lithium metal or other cell components. In still other variations, the interlayer 240 may be a metal coating including, for example, platinum or gold. In each instance, the interlayer 240 may enable certain materials, like fluorine-containing organic materials (e.g., perfluoroorganosiloxane precursors) and/or boron-containing organic materials, to adhere to the current collector and/or improve the lithium metal plating onto or stripping from the current collector.

In various aspects, the present disclosure provides a method for forming a plurality of surface structures on or at a surface of a current collector, such as illustrated in FIGS. 2A-2E, and/or an attachment layer on or at a surface of a current collector, such as illustrated in FIG. 3; and a method for attaching a current collector and a solid-electrolyte interface layer. In each instance, the surface structures or attachment layer may be directly disposed on or adjacent to a surface of a current collector using, for example, only a vapor deposition process, a roller process, or the like. In such instances, an electroactive material layer (e.g., lithium metal) may be disposed on or adjacent to the exposed surfaces of the current collector and/or the surface structures or attachment layer. For example, in certain variations, a precursor to the surface structures or attachment layer may be deposed on or adjacent to a surface of a current collector and an electroactive material layer may subsequently be disposed on or adjacent to the exposed surfaces of the current collector and/or the precursor and upon reaction of the electroactive material layer and the precursor the surface structures or attachment layer may be formed.

Once the surface structures or attachment layer are formed, a soli-electrolyte interface layer may be formed on or adjacent to the electroactive material layer (e.g., lithium metal), or at an interface between the electroactive material layer and the separator and/or electrolyte. In certain variations, the solid-electrolyte interface layer may be an artificial protective layer that is disposed on or adjacent to the surface structures or attachment layer using, for example, only a vapor deposition process, a roller process, or the like. In other variations, the solid-electrolyte interface layer may be natural solid-electrolyte interface layer that is formed during cell conditioning or cycling. In such instances, the cell may further include an electrolyte additives (e.g., fluorinated materials) that help form a solid-electrolyte interface layer having the desired composition, density, composition, and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrochemical cell comprising:
an electrically conductive material layer;
a precursor material disposed on or adjacent to a first surface of the electrically conductive material layer, wherein the precursor material is disposed on or adjacent to the first surface of the electrically conductive material so as form a distinct, substantially continuous layer or the precursor material is disposed on or adjacent to the first surface of the electrically conductive material layer so as form a plurality of distinct precursor structures disposed on the first surface of the electrically conductive material layer in a predetermined pattern, and wherein the precursor material has an ionic conductivity less than about $10^{-4}$ S/cm; and
an electroactive material layer disposed on or adjacent to the precursor material.

2. The electrochemical cell of claim 1, wherein the distinct, substantially continuous layer has an average thickness greater than or equal to about 0.001 µm to less than or equal to about 20 µm.

3. The electrochemical cell of claim 1, further comprising:
a solid-electrolyte interface layer disposed on or adjacent to an exposed surface of the electroactive material layer.

4. The electrochemical cell of claim 1, wherein the solid-electrolyte interface layer comprises one or more materials selected from the group consisting of: lithium carbonate ($Li_2CO_3$), lithium peroxide ($Li_2O_2$), lithium hydroxide (LiOH), lithium oxide ($Li_2O$), lithium fluoride (LiF), lithium nitride ($Li_3N$), polyolefins, semicarbonates, and combinations thereof.

5. The electrochemical cell of claim 1, wherein at least a portion of each distinct precursor structure is unobstructed by the electroactive material layer.

6. The electrochemical cell of claim 1, wherein at least a portion of each distinct precursor structure extends through the electroactive material layer.

7. The electrochemical cell of claim 1, wherein the distinct precursor structures cover greater than or equal to about 1% to less than or equal to about 50% of a total surface area of the first surface of the electrically conductive material layer, and
wherein the distinct precursor structures have an average spacing greater than or equal to about 0.1 µm to less than or equal to about 50 µm.

8. The electrochemical cell of claim 1, wherein an average height of each distinct precursor structure is greater than or equal to about 20% to less than or equal to about 400% greater than an average thickness of the electroactive material layer.

9. The electrochemical cell of claim 1, wherein an average height of each distinct precursor structure is greater than about 1 µm to less than or equal to about 500 µm, and
wherein the electroactive material layer has an initial thickness greater than about 10 µm to less than or equal to about 200 µm.

10. The electrochemical cell of claim 1, further comprising:
a solid-electrolyte interface layer disposed on or adjacent to an exposed surface of the electroactive material layer and contacting each of the distinct precursor structures, wherein the distinct precursor structures are configured to form surface structures that chemically attach the solid-electrolyte interface layer and the electrically conductive material layer.

11. The electrochemical cell of claim 10, wherein the solid-electrolyte interface layer comprises one or more materials selected from the group consisting of: lithium carbonate ($Li_2CO_3$), lithium peroxide ($Li_2O_2$), lithium hydroxide (LiOH), lithium oxide ($Li_2O$), lithium fluoride (LiF), lithium nitride ($Li_3N$), polyolefins, semicarbonates, and combinations thereof.

12. The electrochemical cell of claim 1, wherein the precursor material comprises one or more materials selected from the group consisting of: polytetrafluoroethylene (PTFE), lithium fluoride (LiF), polyvinylidene difluoride (PVdF), perfluoro-organosiloxane, and combinations thereof.

13. An electrochemical cell comprising:
an electrically conductive material layer;
a plurality of distinct precursor structures disposed on the first surface of the electrically conductive material layer in a predetermined pattern, wherein the distinct precursor structures cover greater than or equal to about 1% to less than or equal to about 50% of a total surface area of the first surface of the electrically conductive material layer, and the distinct precursor structures have an average spacing greater than or equal to about 0.1 µm to less than or equal to about 50 µm; and
an electroactive material layer disposed on or adjacent to the precursor material such that at least a portion of each distinct precursor structure is unobstructed by the electroactive material layer.

14. The electrochemical cell of claim 13, wherein at least a portion of each distinct precursor structure extends through the electroactive material layer.

15. The electrochemical cell of claim 13, further comprising:
a solid-electrolyte interface layer disposed on or adjacent to an exposed surface of the electroactive material layer and contacting each of the distinct precursor structures, wherein the distinct precursor structures are configured to form surface structures that chemically attach the solid-electrolyte interface layer and the electrically conductive material layer.

16. The electrochemical cell of claim 13, wherein the solid-electrolyte interface layer comprises one or more materials selected from the group consisting of: lithium carbonate ($Li_2CO_3$), lithium peroxide ($Li_2O_2$), lithium hydroxide (LiOH), lithium oxide ($Li_2O$), lithium fluoride (LiF), lithium nitride ($Li_3N$), polyolefins, semicarbonates, and combinations thereof; and
wherein each of the distinct precursor structures comprises one or more materials selected from the group consisting of: polytetrafluoroethylene (PTFE), lithium fluoride (LiF), polyvinylidene difluoride (PVdF), perfluoro-organosiloxane, and combinations thereof.

17. An electrochemical cell comprising:
an electrically conductive material layer;
an electroactive material layer disposed on or adjacent to an exposed surface of the electrically conductive material layer;
a solid-electrolyte interface layer disposed on or adjacent to an exposed surface of the electroactive material layer; and
a plurality of distinct surface structures freely available through the electroactive material layer and chemically attaching a first surface of the electrically conductive material layer and the solid-electrolyte interface layer.

18. The electrochemical cell of claim 17, wherein the plurality of surface structures comprise lithium fluoride (LiF), and
wherein the solid-electrolyte interface layer comprises one or more materials selected from the group consisting of: lithium carbonate ($Li_2CO_3$), lithium peroxide ($Li_2O_2$), lithium hydroxide (LiOH), lithium oxide ($Li_2O$), lithium fluoride (LiF), lithium nitride ($Li_3N$), polyolefins, semicarbonates, and combinations thereof.

19. The electrochemical cell of claim 17, wherein the distinct surface structures cover greater than or equal to about 1% to less than or equal to about 50% of a total surface area of the first surface of the electrically conductive material layer, and
wherein the distinct surface structures have an average spacing greater than or equal to about 0.1 μm to less than or equal to about 50 μm.

* * * * *